United States Patent [19]

Cobb

[11] Patent Number: 4,824,316
[45] Date of Patent: Apr. 25, 1989

[54] TRANSPORT SYSTEM

[75] Inventor: James R. Cobb, Oklahoma City, Okla.

[73] Assignee: Incorporated Tank Systems, Inc., Oklahoma City, Okla.

[21] Appl. No.: 140,395

[22] Filed: Jan. 4, 1988

[51] Int. Cl.$^4$ .................................................. B60P 3/40
[52] U.S. Cl. ........................................ 414/458; 280/2; 280/425.2; 414/495
[58] Field of Search ............... 414/458, 459, 495, 498; 280/2, 423 B, 425 A

[56] References Cited

U.S. PATENT DOCUMENTS

| | | | |
|---|---|---|---|
| 3,055,523 | 9/1962 | Wurn | 414/498 |
| 3,631,999 | 1/1972 | Walerowski | 414/458 |
| 3,795,336 | 3/1974 | Acker et al. | 414/458 |
| 4,199,298 | 4/1980 | Webre, Jr. et al. | 414/458 |
| 4,297,068 | 10/1981 | Concha et al. | 414/458 |
| 4,452,555 | 6/1984 | Calabro | 414/458 X |
| 4,712,966 | 12/1987 | Gross | 414/458 |

Primary Examiner—David A. Bucci
Attorney, Agent, or Firm—Dunlap, Codding Peterson & Lee

[57] ABSTRACT

A system for transporting a structure to a site of use via a towing truck and a wheeled dolly that support opposite ends of the structure during transport. Two coupling members, one mounted on the dolly and the other mountable on the truck, each have fixed connectors that mate with fixed connectors on the ends of the structure. Such mating is facilitated by providing each of the coupling members with hooks that engage a bar on the end of the structure and a positioning assembly that moves the hooks vertically, longitudinally and laterally. The positioning assembly has an outer frame that is moved vertically on the coupling member by hydraulic actuating cylinders and contains an inner frame that is moved longitudinally on the outer frame by a hydraulic actuating cylinder connected between the frame. The hooks are supported on a plate that is moved laterally in the inner frame by a double-ended hydraulic actuating cylinder on the plate. Hydraulic jacks on the coupling members stabilize the system while the structure is positioned.

18 Claims, 9 Drawing Sheets

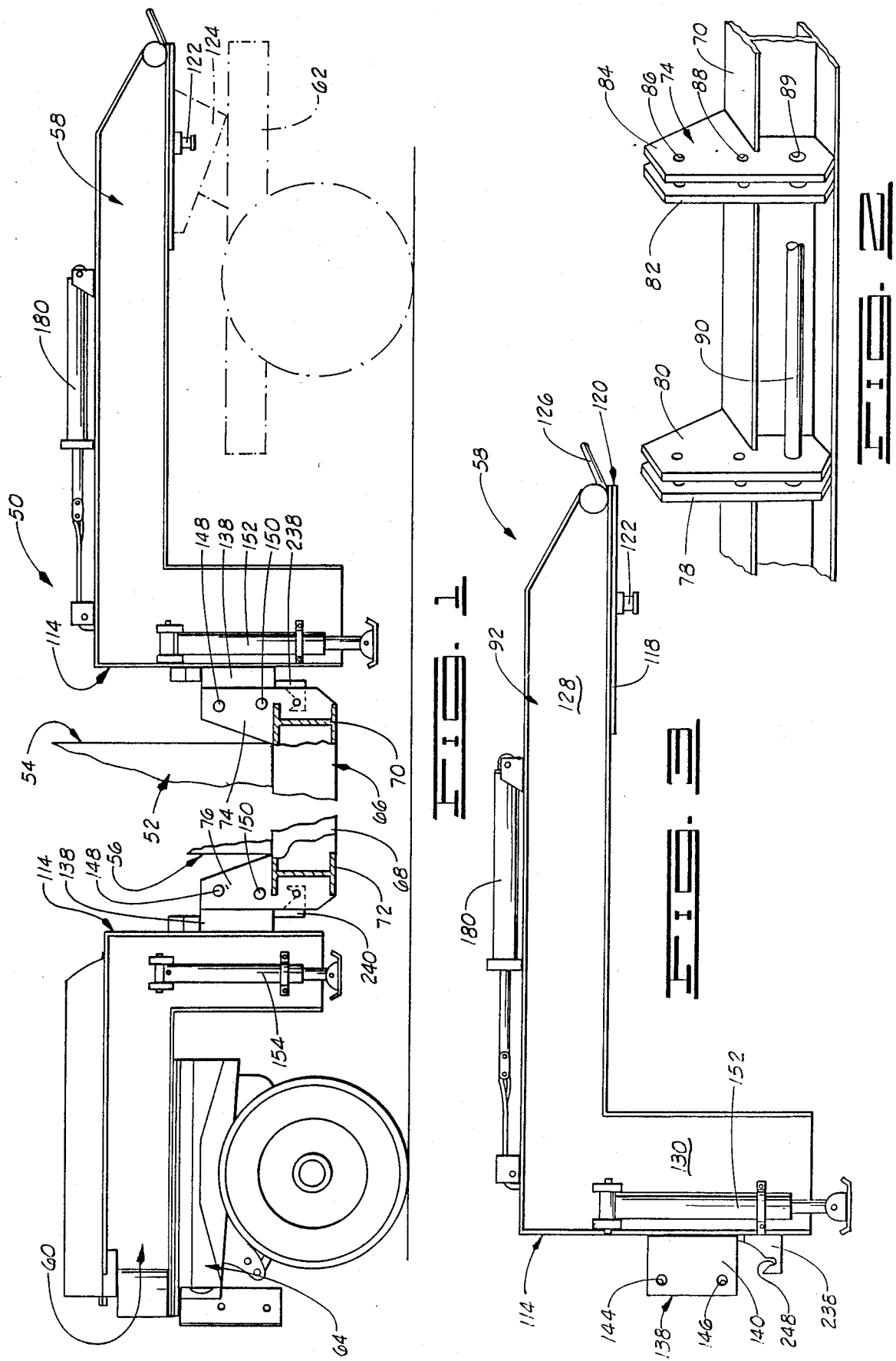

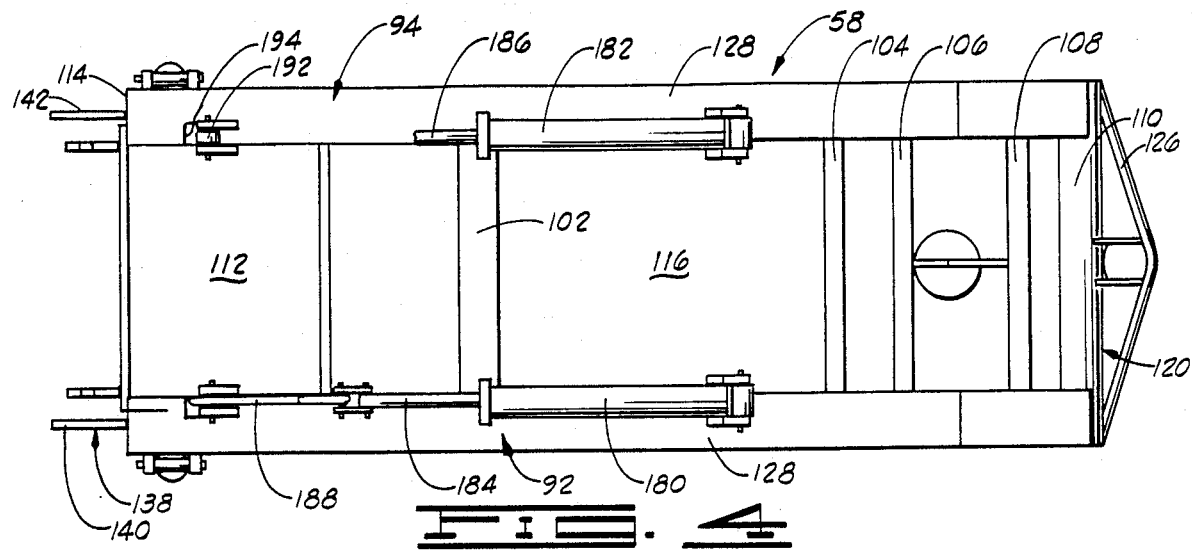
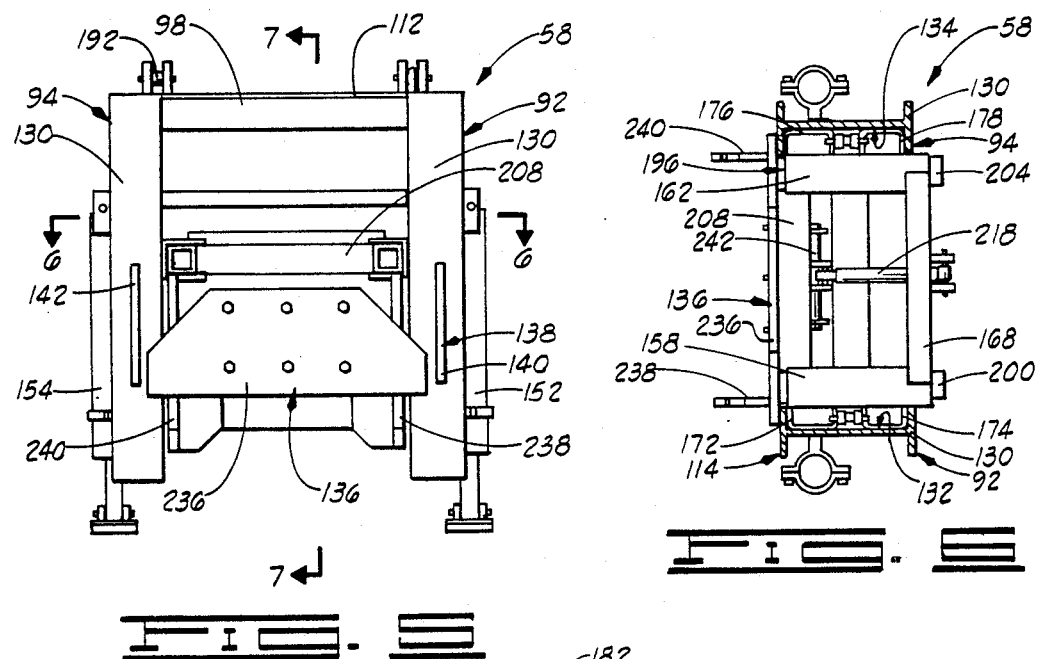
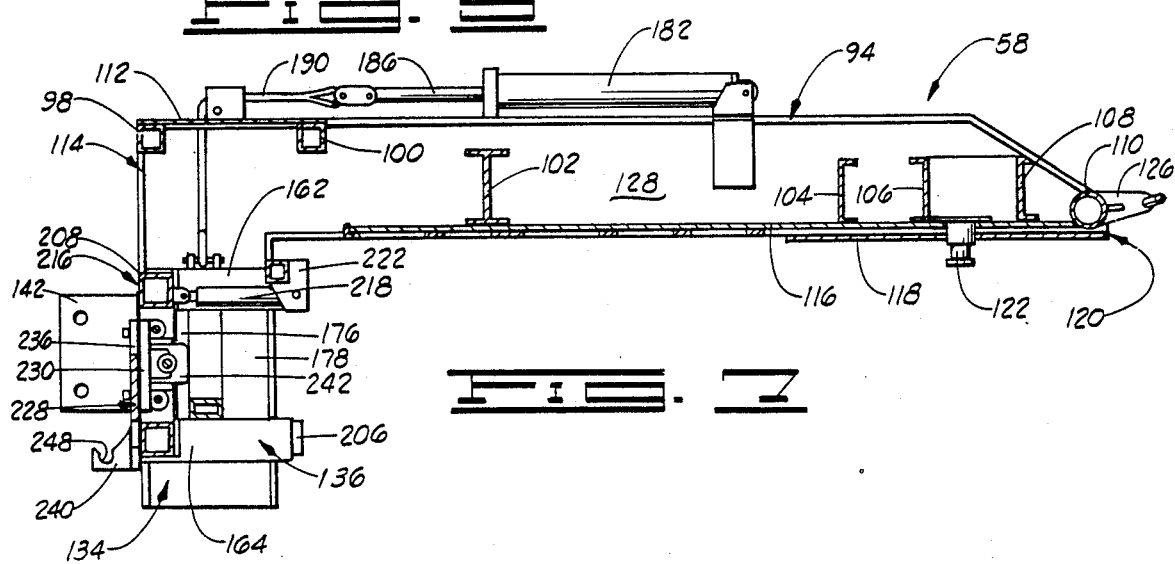

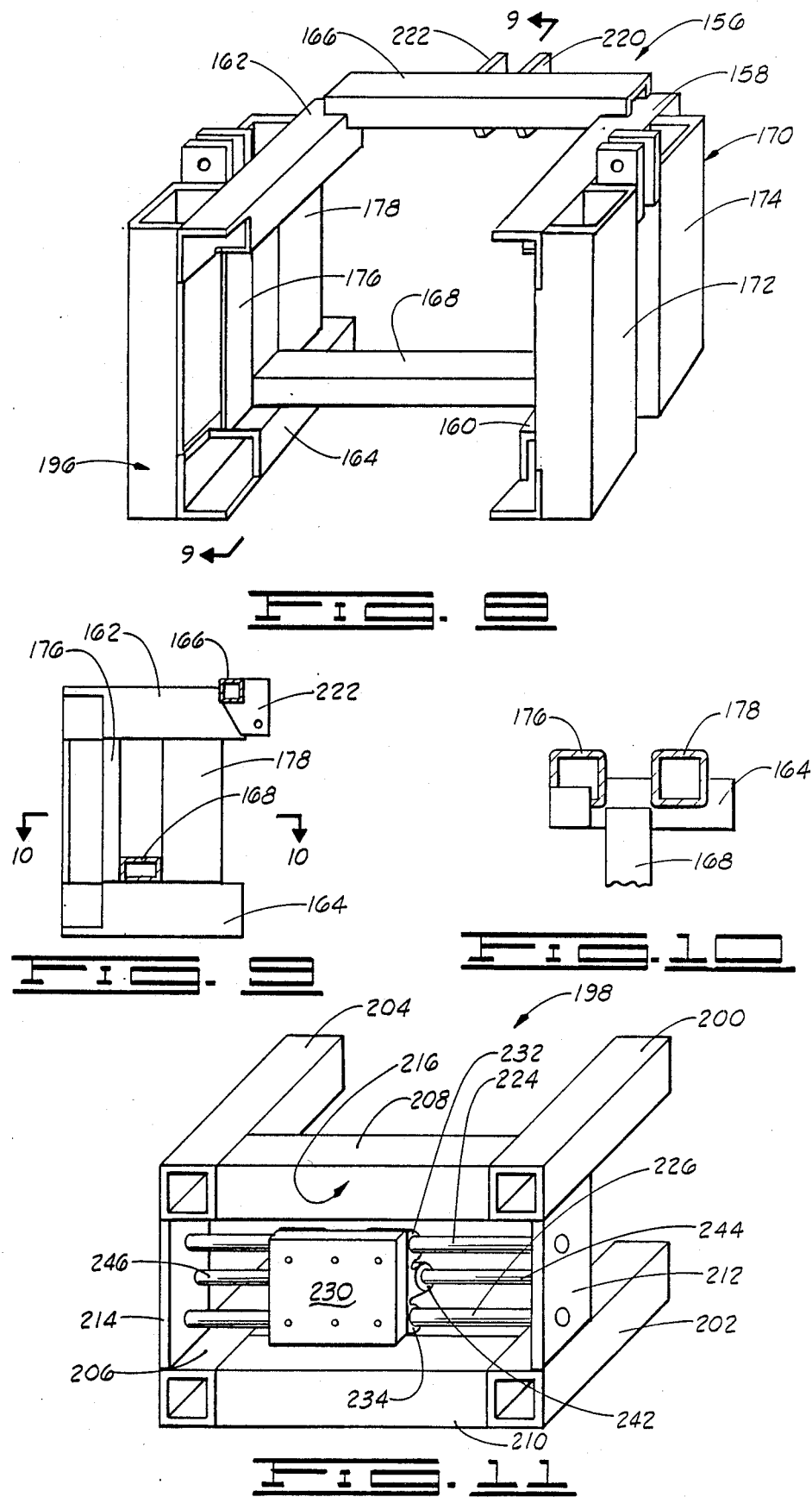

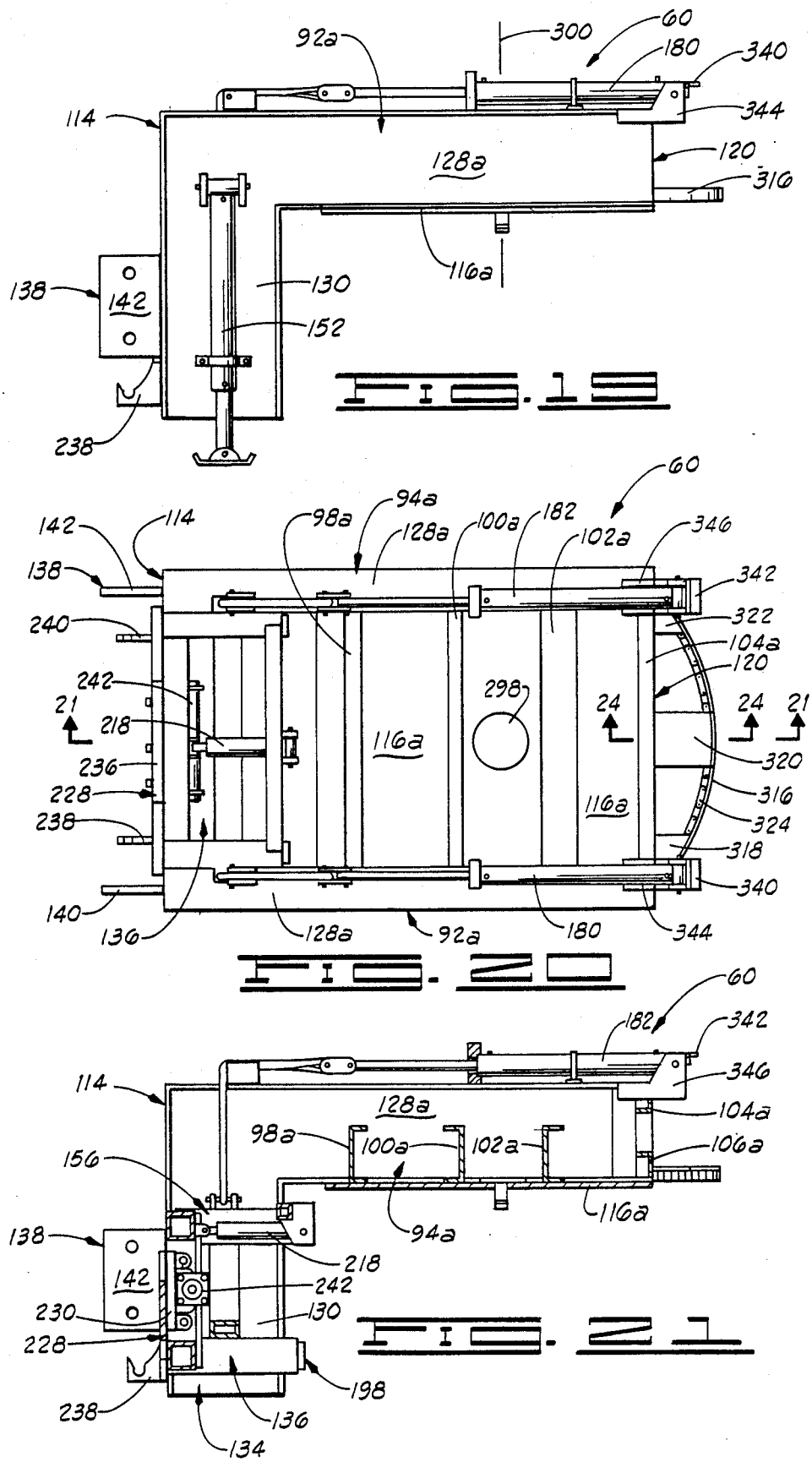

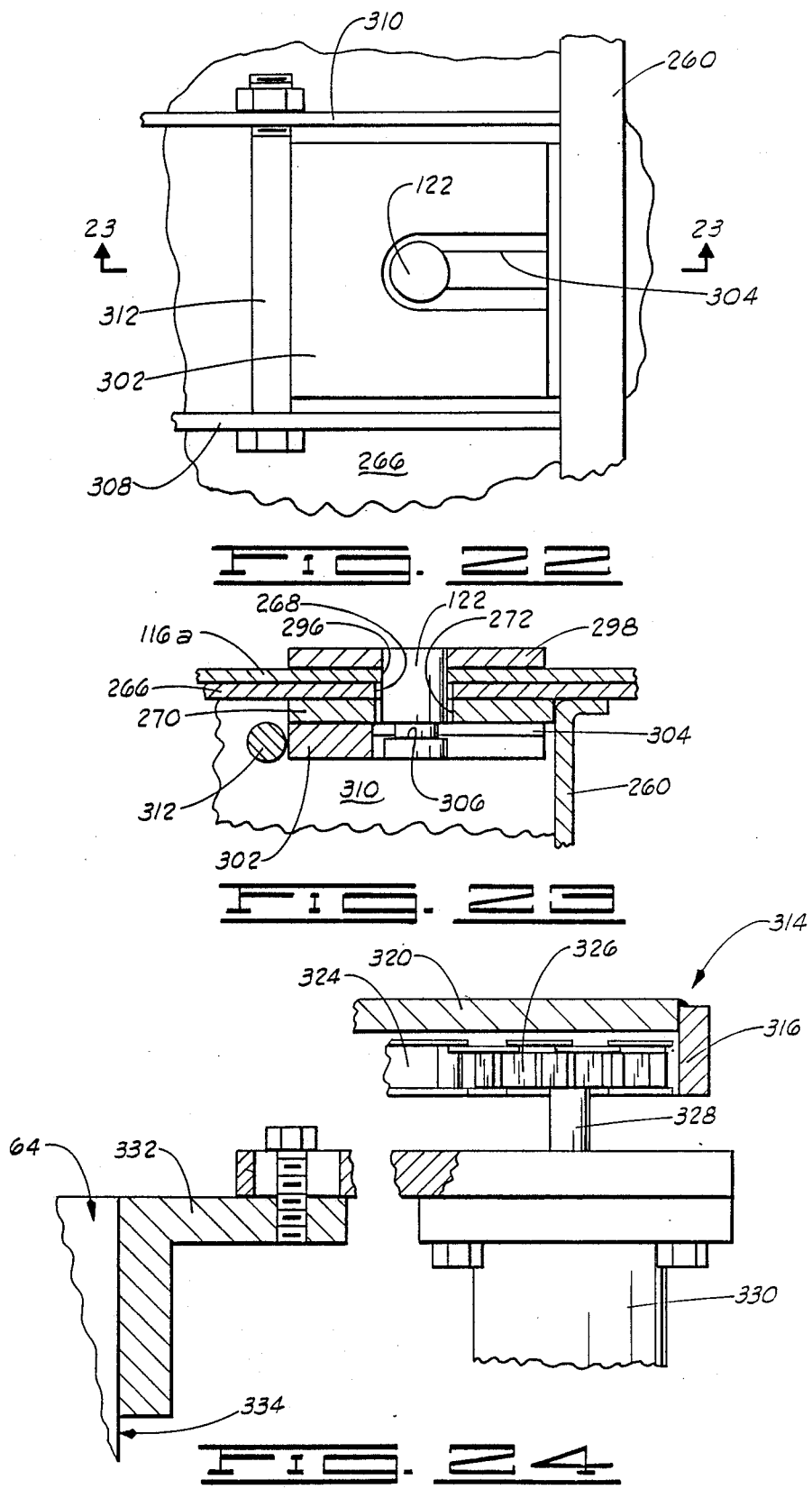

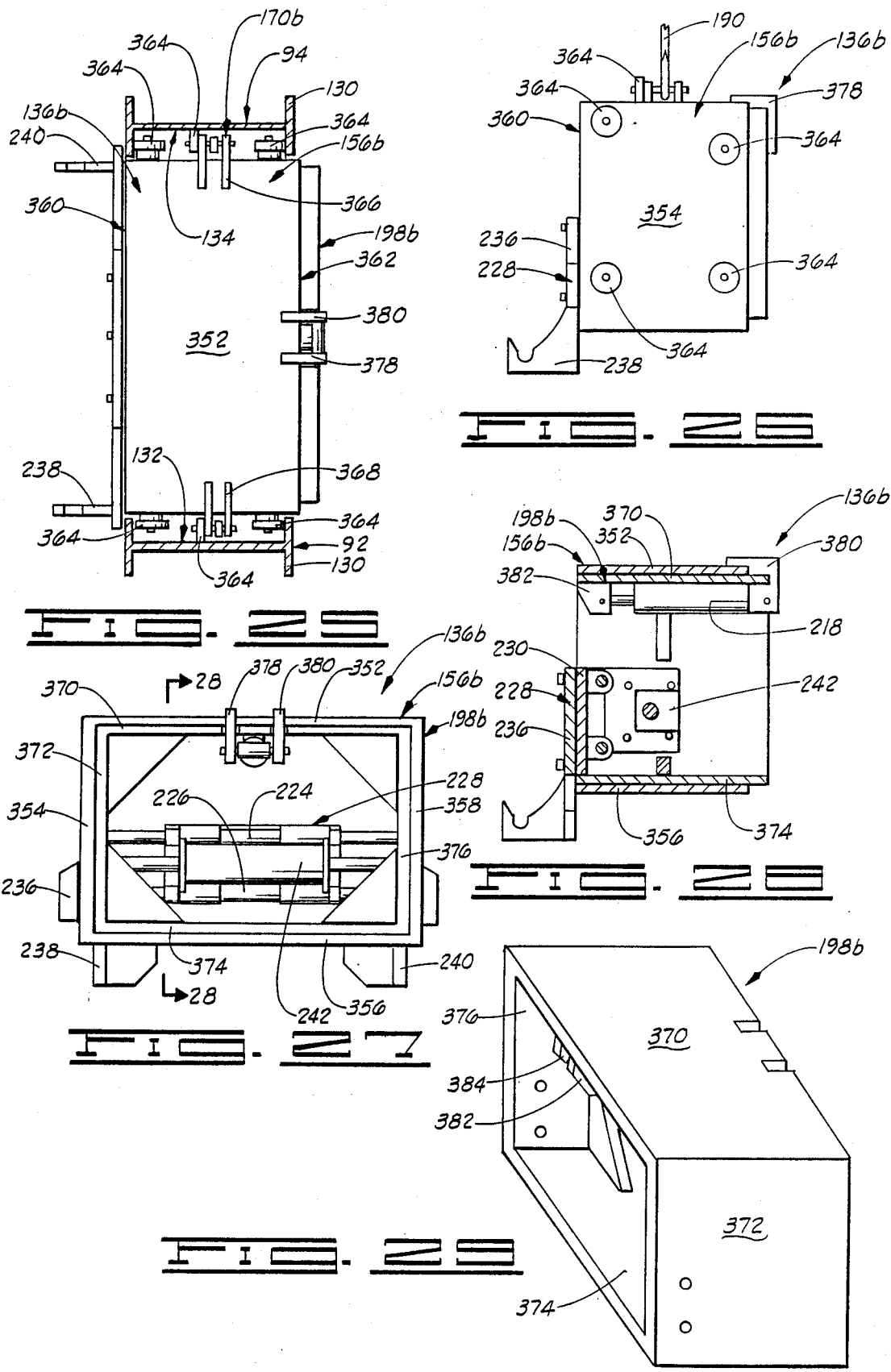

TRANSPORT SYSTEM

CROSS-REFERENCE TO RELATED APPLICATION

The subject matter of the present application is related to the subject matter of my co-pending U.S. patent application entitled: MOBILE STORAGE TANK BATTERY, Ser. No. 052,605, filed May 19, 1987.

BACKGROUND OF THE INVENTION

The present invention relates generally to improvements in apparatus for transporting structures to locations of use and more particularly, but not by way of limitation, to improvements in apparatus for transporting oil field storage tank batteries.

As discussed in my co-pending U.S. patent application, Ser. No. 052,605, the teachings of which are incorporated herein by reference, an oil well will generally produce salt water, as well as the oil and gas for which the well is drilled, and it is common practice to separate these three fluids at the site of the well. The gas is transmitted to a sales line for delivery to a consumer and the oil and salt water are temporarily stored in tanks for subsequent final disposition.

Prior to the invention of the mobile storage tank battery discussed in my co-pending application, there were a number of problems associated with this storage of oil and salt water. In particular, establishing a battery of tanks to store the oil and salt water was an expensive and time consuming operation that, moreover, had to be carried out before it could be known whether the well would produce oil and gas in paying quantities. If not, the expense of setting up a tank farm and its subsequent removal would be wasted.

The mobile storage tank battery of my co-pending application greatly reduces these expenses by providing a tank farm that can be easily transported, as a unit, to the site of an oil well and quickly emplaced using a small work crew. Additionally, should the well fail to produce sufficient quantities of oil and gas to justify continued production, my mobile storage tank battery can be removed from the well site and, after cleaning, transported to a different well site so that no loss in value of the battery is occasioned by the initial set up of the battery. Thus, my mobile storage tank battery has provided an important advance in oil field technology by minimizing the cost of setting up and removing tank farms from the sites of individual oil wells.

However, experience with my mobile storage tank battery has indicated that further savings can be obtained. In particular, the time that is required to emplace the tank farm and, at a later date, to remove it, can be further reduced to further limit the labor costs associated with these operations. The present invention provides a transport system which minimizes these times. In particular, the present invention eliminates a need to carefully position transporters which support the ends of the tank battery during road transport prior to emplacement of the tank battery or reattachment of the tank battery to the transporters.

SUMMARY OF THE INVENTION

The present invention minimizes the time for emplacement and mobilization of a structure, such as a tank farm, that is to be transported to and from a site of use by facilitating the support of the structure between wheeled transporter units which can be a towing truck and a wheeled dolly. To this end, the transport system of the present invention is comprised of a pair of coupling members, each having fixed connectors that can be rigidly mated with fixed connectors on the ends of the structure for transport and each having a structure positioning assembly engagable with an end of the structure for making fine adjustments to the relative positions of the fixed connectors. The coupling members are mounted on the transporter units during operation of the system so that the transporter units can be utilized to transport the structure to the site of use.

An important aspect of the present invention is that the transporter units need not be precisely positioned with respect to the structure for mating the fixed connectors on the structure with the fixed connectors on the coupling members. Rather, the transporter units need be positioned with respect to the structure only to the extent necessary to place the coupling members near the ends of the structure. The positioning assemblies can then be engaged with the ends of the structure and utilized to position the ends of the structure such that the fixed connectors thereon mate with the fixed connectors on the coupling members for rigid attachment therebetween.

Similarly, should the circumstances of use of the structure dictate that the structure have a precise position at a site at which it will be used, the present invention eliminates any need for precise positioning of the transporter units prior to emplacement of the structure. Rather, the transporter units need be positioned only to the extent that fine adjustments to the structure's position, made by the positioning assemblies, will suffice to attain the desired position of the structure. Following such positioning of the transporter units, support of the ends of the structure can be transferred from the fixed connectors to the positioning assemblies for precise emplacement of the structure.

An object of the present invention is to provide a system for transporting a structure to a site of use that facilitates support of the structure between transporter units.

Another object of the invention is to reduce the costs of transporting structures to and from sites of use by reducing the time required for making connections between the structure and handling equipment.

Still another object of the invention is to provide a transport system for a structure that provides a rigid, safe connection between the structure and transporter units while the structure is being transported while permitting the structure to be precisely positioned for rapid connection to the transporter units and rapid, precise emplacement at a chosen site.

Other objects, advantages, and features of the invention will become apparent from the following detailed description of the invention when read in conjunction with the drawings and appended claims.

BRIEF DESCRIPTION OF THE DRAWINGS

FIG. 1 is a fragmentary side elevational view of a system constructed in accordance with the present invention for mobilizing a structure for transport.

FIG. 2 is an isometric view of portions of the end of the transported structure shown in FIG. 1.

FIG. 3 is a side elevational view of the first coupling member of the system shown in FIG. 1.

FIG. 4 is a top view of the coupling member shown in FIG. 3.

FIG. 5 is a front elevational view of the coupling member shown in FIG. 3.

FIG. 6 is a cross section of the coupling member shown in FIG. 3 along line 6—6 of FIG. 5.

FIG. 7 is a cross section of the coupling member shown in FIG. 3 taken along line 7—7 of FIG. 5.

FIG. 8 is an isometric view of the outer frame of one preferred embodiment of the positioning assembly of which the coupling members are comprised.

FIG. 9 is a cross section of the outer frame shown in FIG. 8 taken along line 9—9 of FIG. 8.

FIG. 10 is a cross section of the outer frame shown in FIG. 8 taken along line 10—10 of FIG. 9.

FIG. 11 is an isometric view of the inner frame of the one preferred embodiment of the positioning assembly including the outer frame of FIG. 8.

FIG. 19 is a side elevational view of the coupling member shown in FIG. 12.

FIG. 20 is a top view of the coupling member shown in FIG. 19.

FIG. 21 is a cross section of the coupling member shown in FIG. 19 taken along line 21—21 of FIG. 20.

FIG. 22 is a fragmentary view of the underside of the dolly illustrating the connection of the dolly to the second coupling member.

FIG. 23 is a cross section taken along line 23—23 of FIG. 22.

FIG. 24 is a fragmentary, side elevational view in partial cross section of the coupling member pivotation assembly for pivoting the second coupling member on the dolly.

FIG. 25 is a top view of a second embodiment of a positioning assembly for the system shown in FIG. 1.

FIG. 26 is a side elevational view of the positioning assembly shown in FIG. 25.

FIG. 27 is a rear elevational view of the positioning assembly shown in FIG. 25.

FIG. 28 is a cross section of the positioning assembly shown in FIG. 25 taken along line 28—28 of FIG. 27.

FIG. 29 is an isometric view of the inner frame of the positioning assembly shown in FIG. 25.

Description of FIGS. 1 and 2

Figure 12:
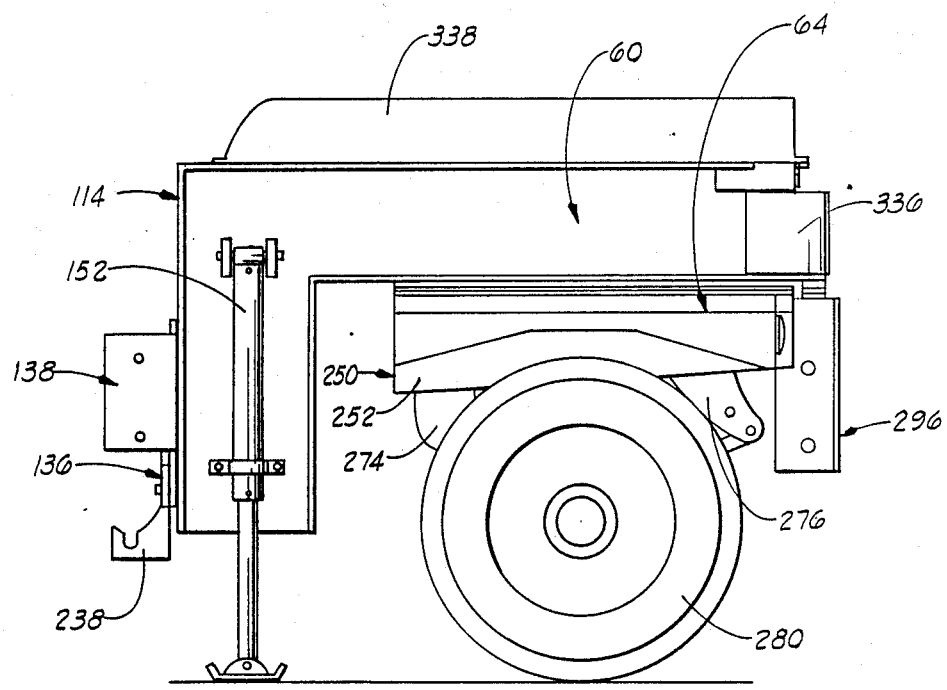
FIG. 12 is a side elevational view of the second coupling member of the transport system of FIG. 1 illustrating the mounting of such coupling member on a wheeled dolly.

Referring first to FIG. 1, shown therein and designated by the general reference numeral 50 is a system constructed in accordance with the present invention for transporting a structure, indicated at 52, to a site at which the structure 52 is to be used. As illustrated in FIG. 1, the system is in a transport mode in which the ends 54 and 56 of the structure 52 are supported via first and second coupling members, 58 and 60 respectively, on wheeled transporter units, 62 and 64 respectively, for transport of the structure 52 along highways and other roads. As has been shown, the transporter units 62 and 64 can be a towing vehicle and a wheeled dolly upon which the coupling members 58 and 60 can be mounted. (The transporters will also be referred to herein as the towing vehicle 62 and the dolly 64.)

In accordance with the invention, the structure 52 is adapted to transport by the transport system 50 and it will be useful to consider the adaptations of the structure 52, shown in FIGS. 1 and 2, prior to discussing the construction of the transport system 50 in order to provide a basis for a clear understanding of the construction of the system 50. Initially, it is convenient for the structure 52 to include a base 66 upon which portions of the structure 52 associated with the use of the structure are mounted. For example, if the structure 52 is a tank battery for storing oil and salt water at the site of a well, the base 66 would carry a battery of tanks to receive these liquids. A suitable construction for the base 66 is that in which the base is comprised of a pair of parallel side beams (one side beam has been illustrated in FIG. 1 and designated by the reference numeral 68 therein) constructed of steel channel and connected at the ends 54 and 56 of the structure 52 by I-beams 70 and 72.

To provide for a rigid connection between the ends of the structure 52 and the coupling members 58 and 60, fixed connectors 74 and 76, each comprised of a plurality of plates, are welded to each of the beams 70 and 72 in an arrangement that has been particularly illustrated for the connector 74 in FIG. 2. As shown in that Figure, the fixed connector 74 is comprised of plates 78 and 80, that are spaced to receive portions of the coupling members to be discussed below, and plates 82 and 84, that are similarly spaced for the same purpose. The plate pairs 78, 80 and 82, 84 are spaced on the I-beam 70 to provide for stable support of the structure 52 in the transport mode of the system. Each of the plates 78, 80, 82, 84 has a portion (not numerically designated in the drawings) extending upwardly from the I-beam 70 and each such portion is provided with a pair of vertically spaced apertures 86 and 88, numerically designated for the plate 84, that permit pin connection of the connector 74 to the coupling member 58 as will be discussed below.

In addition to the portion above the I-beam 70, each of the plates 78, 80, 82, 84 has a portion (not numerically designated in the drawings) that is welded between upper and lower webs of the I-beam 70 and an aperture 89 is formed through such portion of each plate to support a bar 90 that can thus be extended laterally across the end 54 of the structure 52. The purpose of the bar 90, which can be removed during transport of the structure 52, will become clear below. The fixed connector 76 is constructed identically to the fixed connector 74 and is provided with a laterally extending bar that is identical to the bar 90 and can be identically mounted on the end 56 of the structure 52 so that the fixed connector 76 need not be separately described herein.

Description of FIGS. 3 Through 7

FIGS. 3 through 7, to which attention is now invited, illustrate a preferred construction of the first coupling member 58. In general, the coupling member 58 is comprised of a pair of base beams 92 and 94 that are connected together in a substantially parallel relation by a plurality of cross beams 98, 100, 102, 104, 106, 108, 110 to the ends of which the base beams 92 and 94 are welded. A ceiling 112, constructed of steel plate welded to the base beams 92 and 94 across a first end 114 of the coupling member 58, and a floor 116 and sub floor 118, welded between the lower portions of the base beams 92 and 94 at a second end 120 of the coupling member 58, then coact with the cross beams 98, 100, 102, 104, 106, 108, 110 to form the coupling member 58 into a rigid structure that can be mounted on the towing vehicle 62. For this purpose, a stub axle 122 is welded to the floor 116 and sub floor 118 to extend from the subfloor 118 to be conventionally captured by a fifth wheel 124 (FIG. 1) of the towing vehicle 62 for mounting the coupling member 58 on the vehicle 62. A loading hitch 126 is welded to the coupling member 58 at the end 120 thereof to facilitate the mounting of the coupling member 58 on the vehicle 62.

In the preferred embodiment of the coupling member 58, each of the base beams 92 and 94 is constructed of two steel I-beams welded together to provide each of the base beams with a longitudinally extending first portion 128 from which a second portion 130 depends at the first end 114 of the coupling member 58. As can be particularly seen in FIG. 6, such construction results in the formation of two substantially vertical guide channels 132 and 134 by the webs of the second portion 130 of the base beams 92 and 94 on opposite sides of the coupling member 58, the guide channels 132 and 134 facing each other across the interior of the coupling member 58. In the preferred embodiment of the coupling members 58 and 60, the guide channels provide for the mounting of a structure positioning assembly 136 within the space between the portions 130 of the base beams 92 and 94 in a manner and for a purpose to be described below.

As discussed above, the structure 52 is provided with the fixed connectors 74 and 76 on the ends thereof to enable the ends of the structure to be rigidly attached to the coupling members 58 and 60 in the transport mode of the system 50. Such attachment to the first coupling member 58 is effected by the provision of a fixed connector 138 on the first end 114 of the member 58, the fixed connector comprising two plates 140 and 142 welded to the second portions of the base beams 92 and 94 respectively, to extend longitudinally of the end 114. As shown for the plate 140 in FIG. 3, vertically spaced apertures 144 and 146 are formed through the plates 140, 142, and the spacing between the apertures is made equal to the spacing between the apertures 86 and 88 of the plates of the fixed connectors 74 and 76 on the structure 52. The plates 140, 142 are laterally spaced a distance to be received between plate pairs of the fixed connectors 74 and 76 so that rigid connection between the structure 52 and the first coupling member 58 is effected by inserting the plates 140 and 142 between the plate pairs 78, 80 and 82, 84 respectively, and inserting pins 148 and 150 (FIG. 1) through the apertures 86 and 144 and the apertures 88 and 146 respectively. During such insertion, to be discussed below, the coupling member 58 will be stabilized on the earth's surface by hydraulic jacks 152 and 154 mounted on the outwardly facing sides of the second portions of the base beams 92 and 94 as shown in FIGS. 3 and 5.

Description of FIGS. 8 Through 11

FIGS. 8 through 11 illustrate the construction of the component parts of the structure positioning assembly 136 located between the second portions 130 of the base beams 92 and 94. As shown therein, the structure positioning assembly 136 is comprised of an outer frame 156 that, in turn, is comprised of a rectangular array of four parallel square tubes 158, 160, 162, 164 that are interconnected by tubes 166 and 168 and by a guide assembly generally designated by the reference numeral 170 in FIG. 8. The guide assembly 170 is constructed of square tubes 172 and 174 welded between the tubes 158 and 160, at opposite ends of the outer frame 156, and square tubes 176 and 178 similarly welded between the tubes 162, 164 are positioned off center of the tubes 158, 160, 161, 162, 164 so that, as shown in FIG. 6, portions of the tubes 172 and 174 extend into and mate with the guide channel 132 and portions of the tubes 176 and 178 similarly extend into and mate with the guide channel 134 so that the positioning assembly 136 is thereby mounted on the coupling member 58 for vertical sliding movement in the guide channels 132 and 134. Such movement is effected by hydraulic actuating cylinders 180 and 182 that are mounted atop the first portions 128 of the base beams 92 and 94 and have piston rods, 184 and 186 respectively, connected to the portions of the guide assembly 170 in the channels 132 and 134 respectively, by cables 188 and 190 respectively. As shown in FIGS. 4 and 5 for the base beam 94, suitable sheaves 192 can be mounted on the base beams to turn the cables toward the guide assembly 170 and slots 194 can be cut through the upper web of the first portion 128 of the base beams for entry of the cables into the guide channels 132 and 134.

As shown in FIGS. 8 through 10, portions of the tubes 158, 160, 162, 164 and portions of the tubes 172 and 176, adjacent a forward end 196 of the outer frame 156 substantially even with the first end 114 of the coupling member 58 in the assembled system, are cut away to provide for nesting an inner frame 198, shown in FIG. 11, in the outer frame 156. Specifically, the inner frame 198 is comprised of four square tubes 200, 202, 204, 206 that are telescopingly mounted in the tubes 158, 160, 162, 164 respectively (FIGS. 6 and 7), of the outer frame 156 and are formed into a rigid structure by tubes 208 and 210, welded between tubes 200 and 204 and between tubes 202 and 206 respectively, and plates 212 and 214, welded between tubes 200 and 202 and between tubes 204 and 206 respectively, at a forward end 216 of the inner frame 198 generally aligned with the forward end 196 of the outer frame 156. As can be seen in FIGS. 6 and 7, the above described construction and mounting of the inner frame 198 disposes the forward end 216 of the inner frame adjacent the first end 114 of the coupling member 58 and, further, mounts the inner frame 198 on the outer frame 156 for longitudinal sliding movement on the coupling member 58 so that portions of the inner frame adjacent the end 216 thereof can be extended from the end 114 of the coupling member 58. Such movement is effected by a hydraulic actuating cylinder 218 (FIG. 7) connected between the tube 208 of the inner frame 198 and lugs 220 and 222 welded to central portions of the tube 166 of the outer frame 156.

The plates 212 and 214 that connect upper and lower portions of the inner frame 198 are provided with a pair of vertically spaced apertures (not numerically designated in the drawings) that receive bars 224 and 226 that extend across the end 216 of the inner frame 198 and provide a means for mounting a laterally movable structure engagement assembly 228 (FIG. 7) on the inner frame 198. To this end, the structure engagement assembly 228 is comprised of a support plate 230, mounted on the bars 224 and 226 via bearings 232 and 234 respectively, having a plurality of threaded holes (not numerically designated in the drawings) in the face thereof directed away from the interior of the positioning assembly 136 to provide for bolting an engagement plate 236 (FIGS. 5-7) to the support plate 230 such that the engagement plate 236 will extend across the first end 114 of the coupling member 58 in the assembled system 50. Hooks 238 and 240 (FIGS. 3, 5, 6 and 7) are welded to the underside of the engagement plate 236 to extend longitudinally from the first end 114 of the coupling member 58 in the assembled transport system 50. As particularly shown in FIG. 7, a double-ended hydraulic actuating cylinder 242 is mounted on the side of the support plate 230 facing the interior of the structure positioning assembly 136 and, as shown in FIG. 11, piston rods 244 and 246 of the hydraulic actuating cylinder 242 extend to the plates 212 and 214 so that the hydraulic actuating cylinder 242 can be used to move the hooks 238 and 240 laterally across the first end 114 of the coupling member 58 in the assembled transport system 50.

As shown in FIGS. 3 and 7, each of the hooks 238 and 240 is constructed to have an upwardly opening slot 248 that is dimensioned to receive one of the bars 90 that are extended laterally across the ends of the structure 52. Thus, the ends of the structure can be positioned relative to the first end 114 of the coupling member 58, at such times that the coupling member 58 is mounted on a towing vehicle as shown in FIG. 1, by engaging the bar 90 with the hooks 238 and 240 and moving the hooks laterally of the coupling member 58 via the hydraulic actuating cylinder 242, moving the inner frame 198 longitudinally of the coupling member 58 via the hydraulic actuating cylinder 218, and moving the outer frame 156 vertically via the hydraulic actuating cylinders 180 and 182. Pressurized hydraulic fluid for the hydraulic actuating cylinders 180, 182, 218 and 242, as well as the jacks 152 and 154, can be supplied by a conventional hydraulic pump driven by an automotive vehicle starter motor and battery mounted on the coupling member 58 between the first portions 128 of the base beams 92 and 94. The pump, motor, battery and a switching circuit for selectively transmitting pressurized hydraulic fluid to the hydraulic actuating cylinders and jacks are conventional and need not be discussed herein.

Description of FIGS. 12 Through 24

The present invention contemplates that the second coupling member 60 and dolly 64 will be operated as a unit having the general structure shown in FIGS. 12 through 15. Accordingly, it will be useful to describe the construction of these components of the transport system 50 in the context of such operation. Thus, the construction of the dolly is shown in FIGS. 12 through 15 in conjunction with FIGS. 16 through 18 while the construction of the second coupling member 60 is shown in FIGS. 12 through 15 in conjunction with FIGS. 19 through 21. FIGS. 22 and 23 illustrate the manner in which the second coupling member 60 is attached to the dolly and FIG. 24 illustrates structures that provide an added positioning capability for the second coupling member 60 with respect to the end of a structure 52 to be transported.

Figure 16:
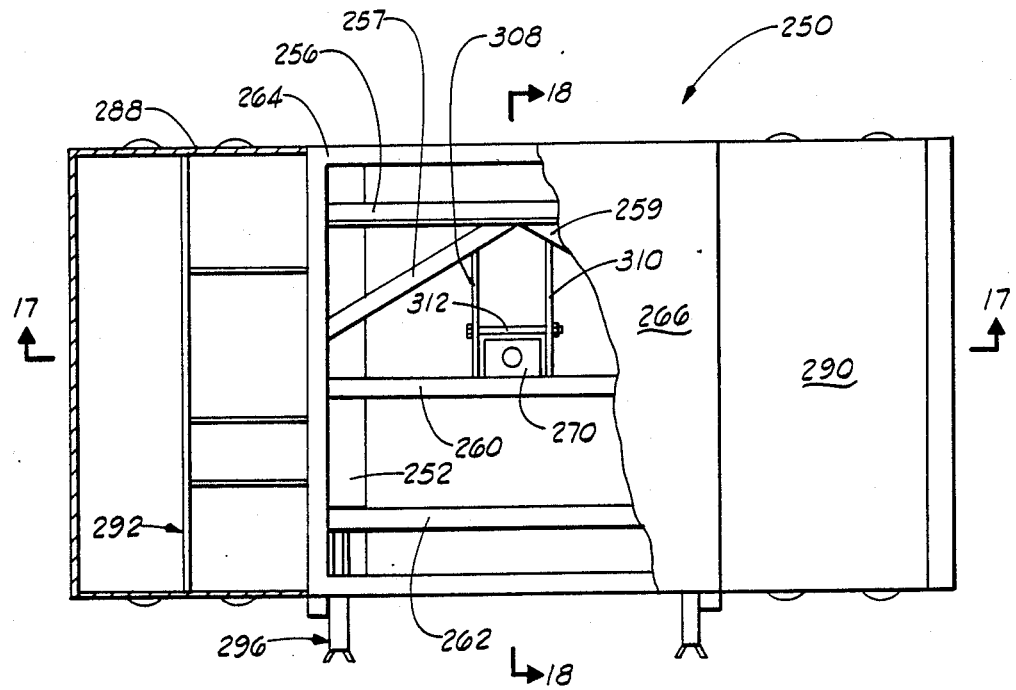
FIG. 16 is a top view in partial cutaway of the chassis of the dolly shown in FIG. 12.
Figure 17:
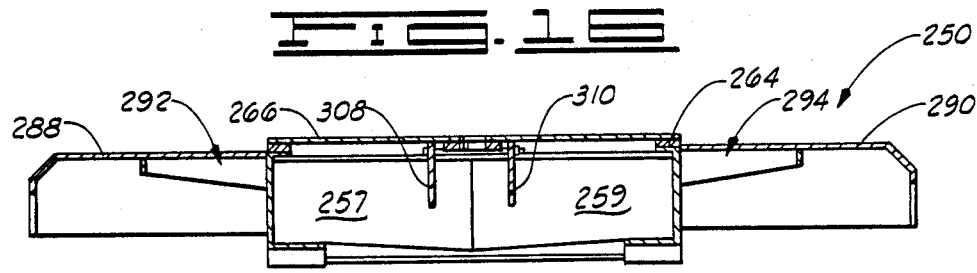
FIG. 17 is a cross section of the dolly chassis taken along line 17—17 of FIG. 16.
Figure 18:
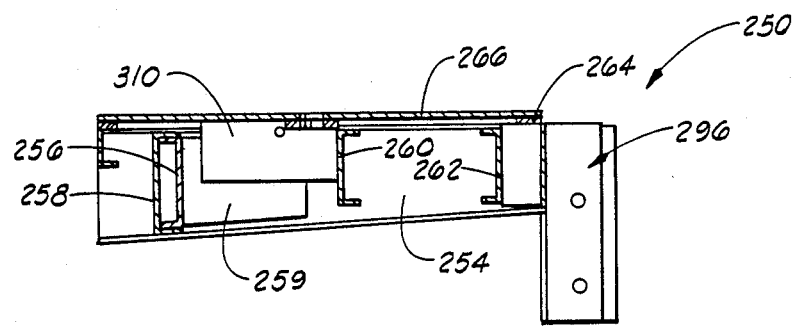
FIG. 18 is a cross section of the dolly chassis taken along line 18—18 of FIG. 16.

Referring first to FIGS. 12 through 18, the dolly 64 is comprised of a chassis 250 that has been particularly illustrated in FIGS. 16 through 18. As shown therein, the chassis 250 is comprised of a main frame (not numerically designated in the drawings) constructed of longitudinal bolsters 252 and 254 that are connected in a substantially parallel relation by cross members 256, 258, 260, 262 that are welded to the bolsters 252, 254 and extend laterally therebetween. Reinforcement for central portions of the chassis 250, is provided by braces 257 and 259 that are welded between central portions of the cross member 258 and the bolsters 252 and 254 respectively. A square, open-centered spacer 264 is welded to the tops of the bolsters 252, 254 to extend about the upper periphery of the main frame and a cover plate 266 is welded atop the spacer 264. As particularly shown in FIG. 23, an aperture 268 is formed through portions of the cover plate 266 that overlay the reinforced central portions of the chassis and a plate 270, having aperture 272 formed therethrough in alignment with the aperture 268, is welded to the underside of the cover plate 266. The purpose of these features will become clear below.

Returning now to FIG. 12, conventional wheel mounts 274 and 276 are welded to the underside of the bolster 252 and similar wheel mounts (not shown) are welded to the underside of the bolster 254 to connect the chassis 250 to an axle 278 (FIG. 15) that extends laterally below the chassis 250. Wheels 280, 282, 284, 286 mounted on the ends of the axle 278 then support the chassis 250 for rolling movement on the earth's surface in a conventional manner. It is contemplated that the dolly can be further provided with a conventional brake system for the wheels 280, 282, 284, 286. For clarity of illustration, the brake system for the dolly has not been illustrated in the drawings. Returning now to FIGS. 17 and 18, and with reference to FIGS. 13-15, fenders 288 and 290 overlaying the wheels 280, 282, 284 286 are welded to the bolsters 252 and 254 respectively, and supported above the wheels via braces generally designated 292 and 294 in FIGS. 16 and 17.

As has been discussed in my co-pending U.S. patent application, Ser. No. 052,605, referred to above, it desirable to remove elements of a transport system for a tank battery; for example, the system 50, from the site of a well following delivery of the tank battery to prevent theft of the battery or elements of the transport system. Thus, as in the case of the dolly of my referenced application, the dolly of the present invention is provided with a connector 296, comprised of two spaced pairs of spaced plates (not numerically designated in the drawings) constructed similarly to the connector 74 on the structure 52 to mate with the connector 138 on the first coupling member 58 and thereby permit the dolly 64 to be coupled to the first coupling member 58 following delivery of a tank battery and removed, along with the coupling members 58 and 60, from a well site via the towing vehicle 62.

The second coupling member 60 is constructed in a manner similar to the first coupling member 58 so that it will not be necessary for purposes of the present disclosure to repeat the description of components that are common to both coupling members 58 and 60. Rather, a better understanding of the invention can be provided by using the same numerical designations for corresponding components of the two coupling members, with an appended letter "a" for components of the second coupling member 60 that differ in constructional details from the same components of the first coupling member 58, and noting any differences in construction between the two coupling members.

With this convention in mind, and with reference to FIGS. 12 through 15 and FIGS. 19 through 21, the second coupling member 60 is comprised of substantially parallel base beams 92a and 94a that differ from the base beams 92 and 94 of the first coupling member 58 only in that the first portions 128a thereof are shorter than the first portions 128 of the base beams 92 and 94. In particular, portions of the base beams 92a and 94a adjacent the second end 120 of the second coupling member 60; that is, portions that carry the loading hitch 126 of the first coupling member 58, have been deleted so that the second end 120 of the second coupling member 60 is located immediately adjacent hydraulic actuating cylinders 180 and 182 that are identical to the identically numbered hydraulic actuating cylinders 180 and 182 of the first coupling member 58. The second portions 130 of the base beams 92a and 94a are identical to the second portions of the base beams 92 and 94 and, as in the case of the second portions of the base beams 92 and 94, depend from the first end 114 of the second coupling member 60 to form facing guide channels that are identical to the guide channels 132 and 134 of the first coupling member 58. A structure positioning assembly 136, constructed identically to the structure positioning assembly 136 of the first coupling member 58, is mounted in the guide channels of the second coupling member 60 to be raised and lowered therein by the hydraulic actuating cylinders 180 and 182 mounted on the first portions 128a of the base beams 92a and 94a. Thus, an end of the structure 52 can be engaged and positioned on the end 114 of the second coupling member 60 in the same manner that has been described above for the positioning of an end of the structure 52 on the end 114 of the first coupling member 58. In particular, the positioning assembly 136 of the second coupling member 60 can be utilized to mate one of the fixed connectors 74, 76 of the structure 52 with a fixed connector 138, comprised of plates 140 and 142, welded to the end 114 of the second coupling member 60. Similarly, stabilization of the dolly 64 and second coupling member 60 during lifting and positioning of an end of the structure 52 is provided by hydraulic jacks 152 and 154 mounted on the exteriors of the second portions 130 of the base beams 92a and 94a. As in the case of the first coupling member 58, a self-contained hydraulic circuit (not shown) is mounted on the second coupling member 60, between the base beams 92a and 94a thereof, for operating the hydraulic jacks 152 and 154 and the hydraulic actuating cylinders 180, 182, 218 and 242 of the structure positioning assembly 136 on the second coupling member 60.

The second coupling member 60 is further comprised of a sheet metal floor 116a, welded to the undersides of the first portions 128a of the base beams 92a and 94a, and cross beams 98a, 100a, 102a, 104a welded to the base beams 92a and 94a and extending therebetween to form the second coupling into a rigid structure. An aperture 296 (FIG. 23) is formed through central portions of the floor 116a and a stub axle 122 is mounted in the aperture 296, via a reinforcement plate 298 welded to the shaft 122 and the floor 116a, to extend from the underside of the floor 116a for pivotal connection of the second coupling member 60 on the dolly 64 about a vertical coupling member pivotation axis 300 laterally centered with respect to the second coupling member 60 and displaced a distance from the second end 120 thereof as shown in FIG. 19. As shown in FIGS. 22 and 23, the stub axle 122 of the second coupling member 60 extends through the apertures 268 and 272 formed through the dolly cover 266 and plate 270 and is retained by a keeper plate 302 having a slot 304 formed therethrough to mate with a circumferential groove 306 formed on the stub axle 122 of the second coupling member 60. The keeper plate 302 is maintained in position by the cross member 260 of the dolly chassis, plates 308 and 310 welded to the underside of the dolly cover 266 on opposite sides of the apertures 268 and 272 and to the cross member 260 and braces 257 and 259 as shown in FIGS. 16–18, and a bolt 312 that is passed through apertures (not numerically designated in the drawings) formed through the plates 308 and 310 adjacent the side of the keeper remote from the cross member 310.

Figure 13:
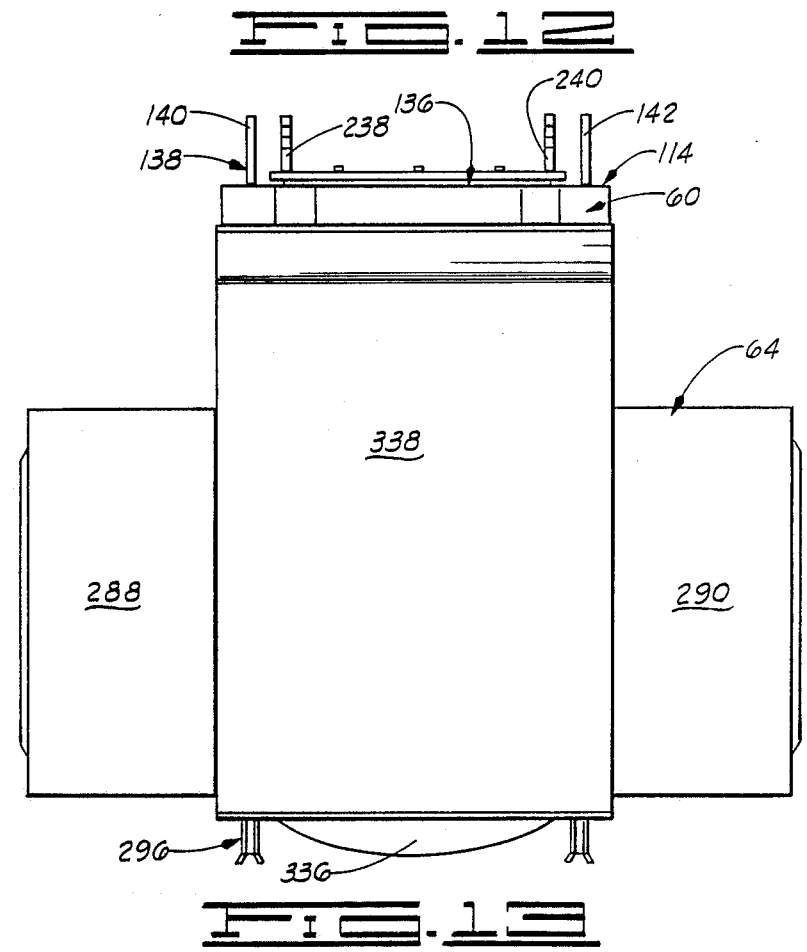
FIG. 13 is a top view of the coupling member and dolly shown in FIG. 12.
Figure 14:
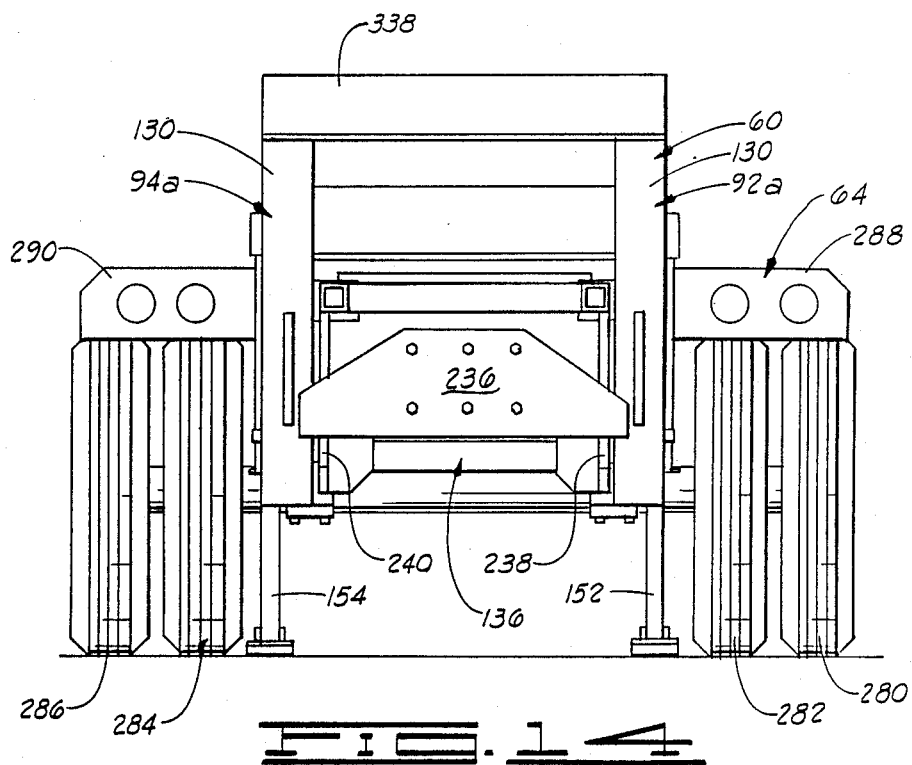
FIG. 14 is a front elevational view of the coupling member and dolly shown in FIG. 12.
Figure 15:
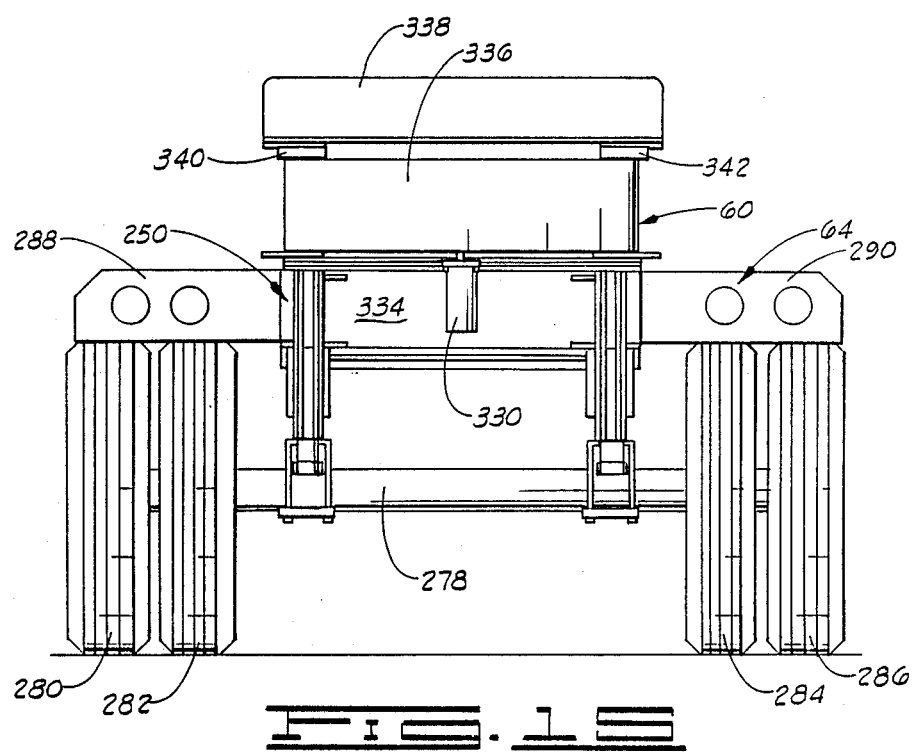
FIG. 15 is a rear elevational view of the coupling member and dolly shown in FIG. 12.

Pivotation of the second coupling member 60 on the dolly 64 is effected by a pivotation assembly 314 mounted partially on the dolly 64 and partially on the second coupling member 60 as shown in FIG. 24. In particular, the pivotation assembly 314 is comprised of a drive chain guide 316 mounted on the second end 120 of the second coupling member 60 to extend in an arc, stabilized by gussets 318, 320, 322 (FIG. 20), across the end 120 and centered on the pivotation axis 300 as indicated in FIGS. 19–21. A drive chain 324 is welded along the inner surface of the guide 316 and a sprocket 326 mounted on the shaft 328 of a hydraulic motor 330 engages the chain 324. The motor 330 is mounted on a bracket 332 welded to central portions of the rear end 334 of the chassis 250 of the dolly 64 (see also FIG. 15) so that pivotation of the second coupling member 60 on the dolly 64 can be effected by transmission of pressurized hydraulic fluid to the motor 330 from the aforementioned hydraulic circuit (not shown) used to operate the hydraulic actuating cylinders 180, 182, 218, and 242 of the positioning assembly 136 and the jacks 152 and 154 of the second coupling member 60. The pivotation assembly 314 can be protected from the weather by a shroud 336 mounted on the end 120 of the second coupling member 60 as shown in FIGS. 12 and 13 and similar protection for the interior of the second coupling member 60 can be obtained by a cover 338 hingedly connected to the base beams 92a and 94a by hinges 340, 342 (FIGS. 19–21) mounted on brackets 344, 346 that support the hydraulic actuating cylinders 180 and 182 on the base beams 92a and 94a.

Operation of the Transport System

The operation of the transport system 50 can best be understood by considering the emplacement of a structure 52 from the transport mode illustrated in FIG. 1 and the subsequent return of the system 50 and structure 52 to the transport mode. As shown in FIG. 1, the fixed connectors 138 of the coupling members 58 and 60 are positioned within the fixed connectors 74 and 76 on the ends of the structure 52 in the transport mode of the system and pins 148 and 150 passing through the apertures of the plates of the connectors 138, 74 and 76 form rigid connections between the ends 54 and 56 of the structure 52 and the coupling members 58 and 60. In such mode, the structure 52 will be positioned above the earth's surface so that, by retracting the hydraulic jacks 152 and 154 on the coupling members 58 and 60 and raising the positioning assemblies 136 in the second portions 130 of the base beams, all support for the system 50 and the structure 52 is provided by the wheels of the dolly 64 and the towing vehicle 62. In such condition, the system 50 and structure can be moved along highways by the towing vehicle 62 to a site at which the structure 52 is to be used.

Once the site of use has been reached, the jacks 152 and 154 are extended to stabilize the coupling members 58 and 60 and the bars 90 are inserted through the apertures 89 of the plates 78, 80, 82, 84. The positioning assemblies 136 then operate to position the hooks 238 and 240 of each positioning assembly 136 below one of the bars 90 on the ends of the structure 52 by using the hydraulic actuating cylinders 180 and 182 to vertically position the outer frames 156 on the coupling members 58 and 60, using the hydraulic actuating cylinders 218 to longitudinally extend the inner frames 198 from the outer frames 156, and using the hydraulic actuating cylinders 242 to laterally position the engagement assemblies 228 and, accordingly, the hooks 238 and 240, on the inner frames 198 as discussed above. From such position, the hooks 238 and 240 of both positioning assemblies 136 can be engaged with the bars 90 by raising the outer frames 156 of both positioning assemblies 136. Thus, the weight of the structure 52 can be transferred from the fixed connectors 138, 74 and 76 to the positioning assemblies 136 of the coupling frames 58 and 60. Following the weight transfer, the pins 148 and 150 are removed from the fixed connectors 138, 74 and 76 so that the structure can be lowered to the earth's surface by operating the hydraulic actuating cylinders 180, 182 to lower the outer frames 156 in the guide channels 132 and 134. Should the circumstances of use of the structure 52 require adjustments to the horizontal position of the structure 52, the hydraulic actuating cylinders 218 and 242 can be operated to provide longitudinal and lateral adjustments to the position of the structure and the hydraulic motor 330 can be operated to orient the structure in the horizontal plane. (During these adjustments, movements of the dolly and the towing vehicle can be selectively permitted or prevented by use of the brakes of these units. When movement occurs, the jacks on the moving unit slide on the earth's surface.) Once the structure 52 has been emplaced, the hydraulic actuating cylinders 180 and 182 are operated to lower the hooks 238 and 240 out of engagement with the bars 90, which are then removed from the connectors 74 and 76, and the inner frames 198 are retracted into the outer frames 156 which are then raised to provide road clearance for lower portions of the positioning assemblies 136. Following retraction of the jacks on the first coupling frame, the towing vehicle 62 is driven to a position that will engage the fixed connector 138 of the first coupling frame 58 with the fixed connector 296 of the dolly 64 and the connectors 138, 296 are pinned together so that the towing vehicle can be utilized, after retraction of the jacks on the second coupling member, to remove both coupling members and the dolly from the use site for the structure.

Once the use of the structure 52 has been completed, the transport system 50 is returned to the site of emplacement of the structure 52 for removal of the structure therefrom. During such return, the dolly 64 will be connected to the first coupling member 58 via a pin connection between the fixed connector 138 on the first coupling member 58 and the fixed connector 296 on the dolly so that the end 114 of the second coupling assembly 60 can be positioned adjacent the end 56 of the structure 52 by positioning the dolly 64 using the towing vehicle and, if necessary, by pivoting the second coupling member 60 on the dolly 64 using the pivotation assembly 314. With the second coupling member 60 so positioned, the hydraulic jacks 152 and 154 thereon are extended to stabilize the dolly 64 and second coupling member 60 preparatory to mating the fixed connector 138 of the second coupling member 60 with the fixed connector 76 on the end 56 of the structure 52. The connection between the fixed connectors 296 and 138 is then broken, by removal of pins from the apertures of the plates of such connectors, and the towing vehicle 62 is used to move the first coupling member 58 to a position in which the first end 114 thereof is adjacent the end 54 of the structure 52. The first coupling member 58 is then stabilized by extending the hydraulic jacks 152 and 154 and the bars 90 are inserted through the apertures 89 of the plates of the connectors 74 and 76.

Following positioning and stabilization of the coupling members 58 and 60, the outer frames 158 of the positioning assemblies thereof are lowered by the hydraulic actuating cylinders 180 and 182 to drop the hooks 238 and 240 of both positioning assemblies to a level below the bars 90 on the ends of the structure. The inner frames 198 of the positioning assemblies are then extended from the outer frames 158 to position the hooks in alignment with the bars 90 and the outer frames are lifted by the hydraulic actuating cylinders 180, 182 to a position that will place the fixed connectors 74 and 76 on the structure 52 immediately below the fixed connectors 138 of each of the coupling members 58, 60. If necessary, the engagement assemblies 228 of the positioning assemblies 136 are shifted laterally on the inner frames 198 to align the spaces between plate pairs of the fixed connectors 74 and 76 with the plates of the fixed connectors 138 on the coupling members. The fixed connectors 138, 74 and 76 can then be mated by raising the outer frames 158 to align apertures through the plates of the connectors and inserting the pins 148 and 150 through such apertures. Following retraction of the hydraulic jacks 152, 154 on the coupling members 58 and 60, the system 50 will be in the transport mode thereof for removal of the structure 52 from the site of use.

Description of FIGS. 25 Through 29

FIGS. 25 through 29 illustrate a second embodiment of a positioning assembly suitable for use in the coupling members of the present invention. As in the description of the coupling members, it will be useful in the description of the positioning assembly shown in FIGS. 25-29 to use the same numerical designations for components of such positioning assembly that have been used for corresponding components of the positioning assembly 136 indicating difference in construction of the components by appending the letter "b" to the numerical designations. Thus, the positioning assembly shown in FIGS. 25-29 has been designated by the general reference numeral 136b therein.

Like the positioning assembly 136, the positioning assembly 136b is comprised of an outer frame 156b which, in the positioning assembly 136b is constructed of plates 352, 354, 356, 358 that are welded together to form a rectangular tube open at both ends 360 and 362. A guide assembly 170b, comprised of a plurality of rollers 364 mounted on the sides and top of the outer frame 156b, extend into the guide channels 132 and 134 in the second portions 130 of the base beams 92 and 94 (or 92a and 94a) and engage the webs forming the channels to guide the outer frame 156b for vertical movement on the base beams 92 and 94 (or 92a and 94a) that can be effected by the hydraulic actuating cylinders 180 and 182 mounted on the coupling members as discussed above in conjunction with the description of the positioning assembly 136. As in the case of the positioning assembly 136, the hydraulic actuating cylinders 180 and 182 are connected to the guide assembly of the outer frame by cables, the cables attaching to brackets 366 and 368 that mount rollers 364 on the top plate 352 to laterally position the outer frame in the base beams of the coupling members, as shown for the cable 190 in FIG. 26.

As in the case of the positioning assembly 136, the outer frame 156b of the positioning assembly 136b is mounted on the coupling members 58 and 60 between the depending portions 130 of the base beams of the coupling members and the open end 360 thereof is placed substantially flush with the first end 114 of the coupling member of which the positioning assembly 136b is a part. Similarly, the positioning assembly 136b is further comprised of an inner frame 198b that is nested within the outer frame 156b for longitudinal extension from the end 114 of the coupling member of which the positioning assembly 136b is a part. In particular, the inner frame is constructed of plates 370, 372, 374, 376 that are welded together to form an open ended tube as shown in FIG. 29 and the sizes of the plates 370–376 are selected such that the outer surfaces of the inner frame 198b will mate with the inner surfaces of the outer frame 156b as shown in FIG. 27. A hydraulic actuating cylinder 218 is connected between depending lugs 378, 380 on the outer frame 156b and lugs 382, 384 on the inner frame for effecting longitudinal extension of the inner frame 198b from the open end 360 of the outer frame 156b.

As shown in FIG. 29, vertically spaced pairs of apertures are formed in the side plates 372 and 376 of the inner frame 198b in the same manner and for the same purpose that apertures are formed in the plates 212 and 214 of the inner frame 198. That is, the apertures in the plates 372 and 376 support bars 224, 226 that extend laterally across the inner frame adjacent the end 114 of the coupling member to slidingly support an engagement assembly 228, identical to the engagement assembly 228 of the positioning assembly 136, for lateral movement of hooks 238, 240 thereof by a double-ended hydraulic actuating cylinder 242.

The operation of a transport system 50 including the positioning assembly 136b is identical to the operation, discussed above, of a transport system including the positioning assembly 136.

It will be clear that the present invention is well adapted to carry out the objects and attain the ends mentioned, as well as those inherent therein. While a presently preferred embodiment has been described for purposes of the present disclosure, numerous changes will suggest themselves to those of skill in the art and which are encompassed within the spirit of the invention disclosed and as defined in the appended claims.

What is claimed is:

1. A system for mobilizing a structure for transport to a site of use by a towing vehicle, comprising:
    a wheeled dolly;
    two coupling members, one mountable on the towing vehicle and one mounted on the dolly, for coupling opposite ends of the structure to the towing vehicle and the dolly during transport of the structure;
    wherein a fixed connector is mounted at a selected location on each end of the structure and wherein each coupling member comprises:
    a fixed connector mounted at a selected location on one end of the coupling member to mate with the fixed connector on one end of the structure; and
    structure positioning means for independent vertical, longitudinal and lateral positioning of said one end of the structure so as to mate the connector on the structure with the connector on the coupling member.

2. The system of claim 1 wherein the structure positioning means comprises:
    an outer frame mounted on the coupling member for substantially vertical movement thereon;
    means for vertically moving the outer frame;
    an inner frame mounted on the outer frame for movement thereon longitudinally of the coupling member;
    means for moving the inner frame on the outer frame;
    structure engagement means, mounted on the inner frame for movement thereon laterally of the coupling member, for forming a temporary connection between the positioning means and an end of the structure; and
    means for moving the structure engagement means on the inner frame, whereby the fixed connector on an end of the structure can be mated with the fixed connector on the coupling member by engaging the end of the structure with the engagement means and positioning the end of the structure via movement of the inner frame, the outer frame and the structure engagement means.

3. The system of claim 2 wherein the engagement means comprises:
    a pair of bars mountable on the ends of the structure to extend laterally thereon;
    a pair of spaced hooks extending from the inner frame longitudinally of the coupling member for supportingly engaging one of the bars; and
    means for moving the hooks on the inner frame laterally of the coupling member.

4. The system of claim 3 wherein the outer frame is comprised of a plurality of parallel, interconnected tubes extending longitudinally of the coupling member; and wherein the inner frame is comprised of a plurality of parallel, interconnected tubes telescopingly mounted in the tubes of the outer frame.

5. The system of claim 3 wherein each of the inner and outer frames are characterized as having the form of a rectangular tube extending longitudinally of the coupling member; and wherein the tubes are sized for nesting the inner frame within the outer frame.

6. The system of claim 2 wherein the outer frame is comprised of a plurality of parallel, interconnected tubes extending longitudinally of the coupling member; and wherein the inner frame is comprised of a plurality of parallel, interconnected tubes telescopingly mounted in the tubes of the outer frame.

7. The system of claim 2 wherein each of the inner and outer frames characterized as having the form of a rectangular tube extending longitudinally of the coupling member; and wherein the tubes are sized for nesting the inner frame within the outer frame.

8. The system of claim 1 wherein the coupling mounted on the dolly is further characterized as being mounted thereon for pivotation about a substantially vertical coupling member pivotation axis; and wherein the system further comprises pivotation means for pivoting such coupling member on the dolly about said axis.

9. The system of claim 8 wherein the pivotation means comprises:
- a drive chain guide mounted on the coupling member to extend along an arc centered on the coupling member pivotation axis;
- a drive chain welded to the drive chain guide to extend thereon along said arc;
- a hydraulic motor mounted on the dolly and having an output shaft extending parallel to the coupling member pivotation axis between said arc and the coupling member pivotation axis; and
- a sprocket mounted on the output shaft of the hydraulic motor and meshing with the drive chain.

10. The system of claim 1 wherein each coupling member further comprises a pair of jacks mounted on opposite sides thereof adjacent said one end thereof whereon the fixed connector is mounted.

11. An apparatus for coupling a structure between wheeled transporters for transport, comprising:
- means on each transporter for connecting the structure to both the transporters;
- a fixed connector mounted at a selected location on one end of each of said connecting means, wherein the structure is characterized as having a mating connector mounted at a selected location on each end thereof for mating with the fixed connector on each connecting means; and
- at least one structure positioning means on at least one of said connecting means for independent vertical, longitudinal and lateral positioning of one end of the structure so as to mate the connector on the structure with the connector on said at least one connecting means.

12. The apparatus of claim 11 wherein the apparatus is further characterized as comprising:
- two substantially parallel base beams, each base beam comprising:
  - a first portion extending longitudinally; and
  - a second portion depending from an end of the first portion whereon the fixed connector is mounted; and
- a plurality of cross beams connected to the base beams and extending therebetween to form the connecting means into a rigid structure;
- wherein the second portion of each of the base beams is comprised of a plurality of webs forming a substantially vertical guide channel facing the guide channel in the other base beam; and wherein the structure positioning means comprises:
- an outer frame located between the depending portions of the base beams;
- guide means having a portion on each side of the outer frame to matingly extend into the guide channel of one of the base beams; and
- means for raising and lowering the guide means in the guide channels.

13. The apparatus of claim 12 wherein each portion of the guide means extending into a guide channel comprises a pair of tubes extending along webs of the base beams forming the guide channels; and wherein the means for raising and lowering the guide means in the guide channels comprises:
- a hydraulic actuating cylinder mounted on the first portion of each of the base beams; and
- a cable extending from the hydraulic actuating cylinder on each base beam to the portion of the guide means in the guide channel of the base beam.

14. The apparatus of claim 13 wherein the structure positioning means further comprises:
- an inner frame supported on the outer frame for movement thereon longitudinally of the connecting means; and
- a hydraulic actuating cylinder connected between the inner and outer frames.

15. The apparatus of claim 14 wherein the structure positioning means further comprises:
- a pair of substantially parallel bars extending laterally across the inner frame;
- a support plate mounted on the bars for sliding movement thereon;
- a double-ended hydraulic actuating cylinder mounted on the support plate and having oppositely extending piston rods engaging opposite sides of the inner frame; and
- means on the support plate for forming a temporary connection to one end of the structure.

16. The apparatus of claim 12 wherein each portion of the guide means comprises a plurality of rollers mounted on one side of the outer frame to engage webs of a base beam forming a guide channel; and wherein the means for raising and lowering the guide means in the guide channels comprises:
- a hydraulic actuating cylinder mounted on the first portion of each of the base beams; and
- a cable extending from the hydraulic actuating cylinder on each base beam to the portion of the guide means in the guide channel of the base beam.

17. The apparatus of claim 16 wherein the structure positioning means further comprises:
- an inner frame supported on the outer frame for movement thereon longitudinally of the connecting means; and
- a hydraulic actuating cylinder connected between the inner and outer frames.

18. The apparatus of claim 17 wherein the structure positioning means further comprises:
- a pair of substantially parallel bars extending laterally across the inner frame;
- a support plate mounted on the bars for sliding movement thereon;
- a double-ended hydraulic actuating cylinder mounted on the support plate and having oppositely extending piston rods engaging opposite sides of the inner frame; and
- means on the support plate for forming a temporary connection to one end of the structure.

* * * * *